United States Patent
Tang et al.

(10) Patent No.: US 11,879,610 B2
(45) Date of Patent: Jan. 23, 2024

(54) MULTI-MODE LIGHTS

(71) Applicant: Apple Inc., Cupertino, CA (US)

(72) Inventors: Xiaofeng Tang, Santa Clara, CA (US); Christopher P Child, San Jose, CA (US); Clarisse Mazuir, San Jose, CA (US); Kurt R Stiehl, Los Gatos, CA (US); Bryce E Wallis, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/890,872

(22) Filed: Aug. 18, 2022

(65) Prior Publication Data

US 2023/0093629 A1 Mar. 23, 2023

Related U.S. Application Data

(60) Provisional application No. 63/246,209, filed on Sep. 20, 2021.

(51) Int. Cl.
*F21S 41/36* (2018.01)
*B60Q 1/16* (2006.01)
*B60Q 1/076* (2006.01)
*F21S 41/47* (2018.01)
*F21S 41/663* (2018.01)
(Continued)

(52) U.S. Cl.
CPC .............. *F21S 41/36* (2018.01); *B60Q 1/076* (2013.01); *B60Q 1/16* (2013.01); *F21S 41/285* (2018.01); *F21S 41/47* (2018.01); *F21S 41/663* (2018.01); *F21S 41/683* (2018.01)

(58) Field of Classification Search
CPC .......... F21S 41/25; F21S 41/255; F21S 41/26; F21S 41/27; F21S 41/148; F21S 41/683; F21S 41/36; F21S 41/663; F21S 41/47; F21S 41/285; B60Q 1/076; B60Q 1/16
See application file for complete search history.

(56) References Cited

U.S. PATENT DOCUMENTS 7,156,542 B2   1/2007  Miller et al.
7,204,628 B2 * 4/2007  Ishida .................. F21S 41/147
                                                           362/545
(Continued)

FOREIGN PATENT DOCUMENTS

CN      106555971 A    4/2017
CN      108626678 A    10/2018
(Continued)

*Primary Examiner* — Matthew J. Peerce
(74) *Attorney, Agent, or Firm* — Treyz Law Group, P.C.; Tianyi He

(57) ABSTRACT

A system may have lights. A light may include a first light source and a first reflector configured to provide lighting for a high-beam mode and for a low-beam mode. The light may include a second light source and a second reflector configured to provide lighting for a cornering light mode. The lighting provided by the first light source and the lighting provided by the second light source may pass through the same headlight lens aperture. A light blocking structure may provide a cutoff pattern that define the illumination pattern of the low-beam lighting and the cornering lighting. One or more additional light sources may be provided to boost the intensity of a hot spot for high-beam lighting.

20 Claims, 8 Drawing Sheets

(51) Int. Cl.
*F21S 41/683* (2018.01)
*F21S 41/20* (2018.01)

(56) References Cited

U.S. PATENT DOCUMENTS

| | | | | |
|---|---|---|---|---|
| 7,500,773 | B2* | 3/2009 | Komatsu | F21S 41/151 362/543 |
| 7,541,743 | B2 | 6/2009 | Salmeen et al. | |
| 8,573,819 | B2* | 11/2013 | Okubo | F21S 41/335 362/465 |
| 9,651,211 | B2* | 5/2017 | Potter | F21S 43/235 |
| 10,262,217 | B2 | 4/2019 | Cohen et al. | |
| 10,502,387 | B2* | 12/2019 | Wang | F21S 41/663 |
| 11,047,540 | B2* | 6/2021 | Kay | E05B 47/0002 |
| 2008/0112173 | A1* | 5/2008 | Dassanayake | F21S 41/151 362/466 |
| 2010/0226142 | A1 | 9/2010 | Brendle et al. | |
| 2011/0080753 | A1* | 4/2011 | Hering | F21S 41/153 362/545 |
| 2011/0169410 | A1* | 7/2011 | Dassanayake | F21S 41/13 362/543 |
| 2012/0203432 | A1* | 8/2012 | Lukacs | B60Q 1/0041 701/42 |
| 2013/0272011 | A1 | 10/2013 | Fedosik et al. | |
| 2014/0362600 | A1* | 12/2014 | Suckling | F21S 41/176 362/583 |
| 2019/0160998 | A1 | 5/2019 | Naserian et al. | |
| 2019/0234579 | A1 | 8/2019 | Wang | |
| 2020/0072428 | A1* | 3/2020 | Simchak | F21S 41/255 |
| 2020/0101890 | A1 | 4/2020 | Solar et al. | |
| 2022/0364698 | A1* | 11/2022 | Fedosik | F21S 41/275 |

FOREIGN PATENT DOCUMENTS

| | | |
|---|---|---|
| DE | 102019104854 A1 | 8/2020 |
| EP | 2505911 A2 | 10/2012 |
| EP | 3412958 A1 | 12/2018 |
| EP | 3543593 A1 | 9/2019 |

* cited by examiner

MULTI-MODE LIGHTS

This application claims the benefit of U.S. provisional patent application No. 63/246,209, filed Sep. 20, 2021, which is hereby incorporated by reference herein in its entirety.

FIELD

This relates generally to systems that have lights.

BACKGROUND

Automobiles and other vehicles have lights such as headlights. To accommodate different driving conditions, headlights are sometimes provided with low-beam and high-beam settings. Sometimes, vehicles are also provided with cornering light capabilities.

SUMMARY

A vehicle may have lights such as headlights. Headlights may provide visible illumination in front of the vehicle using a high-beam mode or a low-beam mode. To improve visibility in other areas surrounding the vehicle such as on the outboard sides of the vehicle, the vehicle may also be provided with cornering light capabilities.

A headlight may include a housing, a first light source for the high-beam mode and the low-beam mode within the housing, and a second light source for cornering light within the housing. The first light source may be backed by a first reflector and may provide light through a projection lens onto the exterior of the vehicle. A shutter (e.g., actuated by a solenoid) may provide a cutoff pattern when in a first position to block a portion of the light emitted from the first light source for the low-beam mode and may be folded down (e.g., removed from the optical path of the portion of light emitted by the first light source) to a second position for the high-beam mode. The second light source may be backed by a second reflector and may provide light through the projection lens onto the exterior of the vehicle. The position of the second light source within the headlight may allow the light emitted from the second light source to be provided as cornering light output from the side of the projection lens. The shutter may also provide a cutoff pattern that defines the illumination pattern of the cornering light. Configured in this manner, the headlight provides a compact headlight having high-beam, low-beam, and cornering light functionalities.

To enhance the illumination of the first light source in the high-beam mode (e.g., to provide an enhanced illumination hot spot), the headlight may include additional light sources placed along the peripheral portion of the projection lens. The light emitted by the first and second light sources may pass through a central portion of the projection lens (defining the lens aperture for the first and second light sources).

If desired, the illumination of the first light source in the high-beam mode may be enhanced by a light source configured to emit light toward a reflector at a rear side of the headlight. The reflected light may pass through the peripheral portion of the projection lens.

DETAILED DESCRIPTION

A system such as a vehicle or other system may have components that emit light such as headlights and other lights. Headlights may provide visible light illumination in front of the vehicle to illuminate roadways and other objects. In order to illuminate roadways and other objects on the outboard sides (e.g., in the vicinity of the left and right sides flanking the front side) of the vehicle, headlights may also provide visible cornering light illumination. The illumination provided by the headlights allows vehicle occupants to view objects at night or in other dim ambient lighting conditions. In particular, the cornering light illumination may be selectively provided in scenarios warranting illumination of an outboard side such as when the vehicle is turning, when the vehicle is changing to a different lane, or in other scenarios.

To provide a compact headlight with front illumination (e.g., having high-beam and low-beam modes) and cornering light illumination, a light source and a reflector for the front illumination and a light source and a reflector for the cornering light illumination may be housed in the same headlight housing and may emit light through a shared aperture of a projection lens. To further enhance the (front) illumination (e.g., in the high-beam mode) of the headlight, one or more additional light sources may also be provided within the headlight housing.

Figure 1:
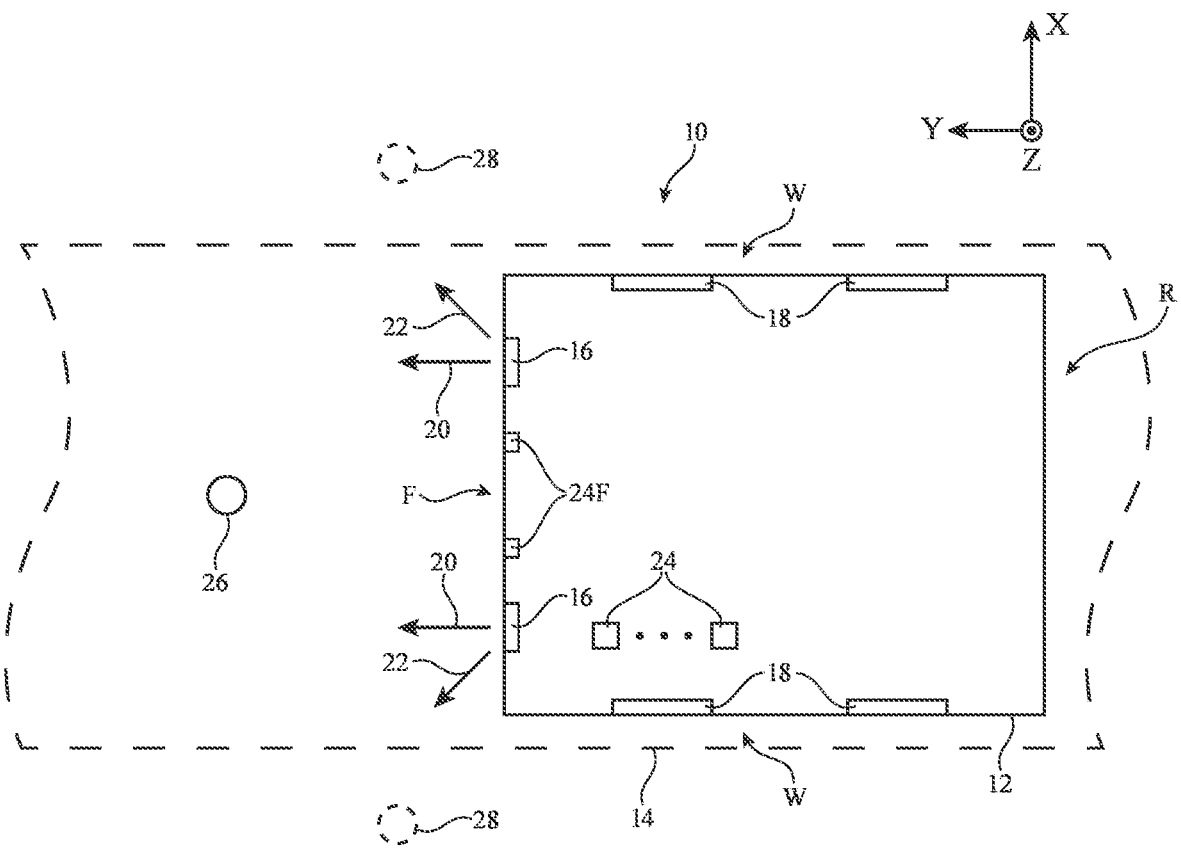
FIG. 1 is a top view of an illustrative vehicle in accordance with an embodiment.

FIG. 1 is a top view of a portion of an illustrative vehicle. In the example of FIG. 1, vehicle 10 is the type of vehicle that may carry passengers (e.g., an automobile, truck, or other automotive vehicle). Configurations in which vehicle 10 is a robot (e.g., an autonomous robot) or other vehicle that does not carry human passengers may also be used. Vehicles such as automobiles may sometimes be described herein as an example. As shown in FIG. 1, vehicle 10 may be operated on roads such as roadway 14. Objects such as object 26 may be located on or near other structures in the vicinity of vehicle 10 such as roadway 14.

Vehicle 10 may be manually driven (e.g., by a human driver), may be operated via remote control, and/or may be autonomously operated (e.g., by an autonomous driving system or other autonomous propulsion system). Using vehicle sensors such as lidar, radar, visible and/or infrared cameras (e.g., two-dimensional and/or three-dimensional cameras), proximity (distance) sensors, and/or other sensors, an autonomous driving system and/or driver-assistance system in vehicle 10 may perform automatic braking, steering, and/or other operations to help avoid pedestrians, inanimate objects, and/or other external structures such as illustrative obstacle 26 on roadway 14.

Vehicle 10 may include a body such as vehicle body 12. Body 12 may include vehicle structures such as body panels formed from metal and/or other materials, may include doors, a hood, a trunk, fenders, a chassis to which wheels are mounted, a roof, etc. Windows may be formed in doors 18 (e.g., on the sides of vehicle body 12, on the roof of vehicle 10, and/or in other portions of vehicle 10). Windows, doors 18, and other portions of body 12 may separate the interior of vehicle 10 from the exterior environment that is surrounding vehicle 10. Doors 18 may be opened and closed to allow people to enter and exit vehicle 10. Seats and other structures may be formed in the interior of vehicle body 12.

Vehicle 10 may have automotive lighting such as one or more headlights (sometimes referred to as headlamps), driving lights, fog lights, daytime running lights, turn signals, brake lights, and/or other lights. As shown in FIG. 1, for example, vehicle 10 may have lights such as lights 16. In general, lights 16 may be mounted on front F of vehicle 10, on rear R of vehicle 10, on left and/or right sides W of vehicle 10, and/or other portions of body 12. In an illustrative configuration, which may sometimes be described herein as an example, lights 16 are headlights and are mounted to front F of body 12. There may be, as an example, left and right headlights 16 located respectively on the left and right of vehicle 10 to provide illumination 20 in the forward direction (e.g., in the +Y direction in which vehicle 10 moves when driven forward in the example of FIG. 1). By shining headlights 16 on external surfaces such as roadway 14 and object 26 in front of vehicle 10, occupants of vehicle 10 may view external surfaces even in dim ambient lighting conditions (e.g., at night). The operation of sensors in vehicle 10 such as image sensors and other sensors that use light may also be supported by providing external surfaces with illumination.

Vehicle 10 may have components 24. Components 24 may include propulsion and steering systems (e.g., manually adjustable driving systems and/or autonomous driving systems having wheels coupled to body 12, steering controls, one or more motors for driving the wheels, etc.), and other vehicle systems. Components 24 may include control circuitry and input-output devices. Control circuitry in components 24 may be configured to run an autonomous driving application, a navigation application (e.g., an application for displaying maps on a display), and software for controlling vehicle climate control devices, lighting, media playback, window movement, door operations, sensor operations, and/ or other vehicle operations. For example, the control system may form part of an autonomous driving system that drives vehicle 10 on roadways such as roadway 14 autonomously using data such as sensor data. The control circuitry may include processing circuitry and storage and may be configured to perform operations in vehicle 10 using hardware (e.g., dedicated hardware or circuitry), firmware and/or software. Software code for performing operations in vehicle 10 and other data is stored on non-transitory computer readable storage media (e.g., tangible computer readable storage media) in the control circuitry. The software code may sometimes be referred to as software, data, program instructions, computer instructions, instructions, or code. The non-transitory computer readable storage media may include non-volatile memory such as non-volatile random-access memory, one or more hard drives (e.g., magnetic drives or solid state drives), one or more removable flash drives or other removable media, or other storage. Software stored on the non-transitory computer readable storage media may be executed on the processing circuitry of components 24. The processing circuitry may include application-specific integrated circuits with processing circuitry, one or more microprocessors, a central processing unit (CPU) or other processing circuitry.

The input-output devices of components 24 may include displays, sensors, buttons, light-emitting diodes and other light-emitting devices, haptic devices, speakers, and/or other devices for gathering environmental measurements, information on vehicle operations, and/or user input and for providing output. The sensors in components 24 may include ambient light sensors, touch sensors, force sensors, proximity sensors, optical sensors such as cameras operating at visible, infrared, and/or ultraviolet wavelengths (e.g., fisheye cameras, two-dimensional cameras, three-dimensional cameras, and/or other cameras), capacitive sensors, resistive sensors, ultrasonic sensors (e.g., ultrasonic distance sensors), microphones, radio-frequency sensors such as radar sensors, lidar (light detection and ranging) sensors, door open/close sensors, seat pressure sensors and other vehicle occupant sensors, window sensors, position sensors for monitoring location, orientation, and movement, speedometers, satellite positioning system sensors, and/or other sensors. Output devices in components 24 may be used to provide vehicle occupants and others with haptic output, audio output, visual output (e.g., displayed content, light, etc.), and/or other suitable output.

Three-dimensional sensors in components 24 may be formed from pairs of two-dimensional image sensors operating together as a stereoscopic depth sensor (e.g., a binocular camera pair forming at three-dimensional camera). Three-dimensional sensors may also be formed using image sensor systems that emit structured light (e.g., arrays of dots, lines, grids, and/or other structured light patterns at infrared and/or visible wavelengths) and that capture images (e.g., two-dimensional images) for analysis. The captured images reveal how the structured light patterns have been distorted by the three-dimensional surfaces illuminated by the structured light patterns. By analyzing the distortion of the structured light, the three-dimensional shape of the surfaces can be reconstructed. If desired, three-dimensional sensors for vehicle 10 may include one or more time-of-flight sensors. For example, time-of-flight measurements may be made using light (e.g., lidar sensor measurements) and radio-frequency signals (e.g., three-dimensional radar).

During operation, the control circuitry of components 24 may gather information from sensors and/or other input-output devices such as lidar data, camera data (e.g., two-dimensional images), radar data, and/or other sensor data. For example, three-dimensional image data may be captured using three-dimensional image sensor(s). Two-dimensional images (e.g., images of headlight illumination on one or more external surfaces associated with object 26 and/or roadway 14) may also be gathered.

A vehicle occupant or other user of vehicle 10 may provide user input to the control circuitry of vehicle 10. Cameras, touch sensors, physical controls, and other input devices may be used to gather the user input. Using wireless communications with vehicle 10, remote data sources may provide the control circuitry of components 24 with database information. Displays, speakers, and other output devices may be used to provide users with content such as interactive on-screen menu options and audio. A user may interact with this interactive content by supplying touch input to a touch sensor in a display and/or by providing user input with other input devices. If desired, the control circuitry of vehicle 10 may use sensor data, user input, information from remote databases, and/or other information in providing a driver with driver assistance information (e.g., information on nearby obstacles on a roadway and/or other environment surrounding vehicle 10) and/or in autonomously driving vehicle 10.

Components 24 may include forward-facing sensor circuitry, as shown by forward-facing sensor(s) 24F of FIG. 1. The forward-facing sensor circuitry may include one or more sensors facing a surface in front of vehicle 10 (e.g., one or more sensors that are directed in the +Y direction of FIG. 1 to detect surfaces of structures in front of vehicle 10 such as obstacle 26 and roadway 14). Sensors 24F and/or other sensors in vehicle 10 may include lidar, radar, visible and/or infrared cameras, and/or other sensors. For example, sensors 24F may include two-dimensional image sensors and/or three-dimensional image sensors operating using structured light, binocular vision, time-of-flight (e.g., lidar or radar), and/or other three-dimensional imaging arrangements. Sensors 24F may include a three-dimensional sensor that measures the three-dimensional shape of one or more external surfaces and that optionally measures the pattern of headlight illumination from headlights 16 on one or more external surfaces. If desired, a two-dimensional image sensor may be used to measure the headlight illumination pattern on one or more external surfaces (e.g., the forward-facing sensor circuitry of vehicle 10 may use three-dimensional and two-dimensional sensors to respectively measure surface shapes and headlight illumination intensity or both of these sensors may be used in gathering information on surface shape and/or surface illumination).

To provide visible light illumination for objects such as objects 28 on the (outboard) sides of vehicle 10, headlights 16 may be provided with cornering light illumination such as illumination 22 in FIG. 1. In the illustrative configuration of left and right headlights 16 being located respectively on the left and right of vehicle 10 as shown in FIG. 1, left headlight 16 may provide illumination to the left outboard side of vehicle 10 (e.g., at an angle between the +Y direction and the −X direction, an azimuth angle from the +Y direction toward the −X direction of greater than 20 degrees, greater than 30 degrees, greater than 35 degrees, less than 90 degrees, etc.), while right headlight 16 may provide illumination to the right outboard side of vehicle 10 (e.g., at an angle between the +Y direction and the +X direction, an azimuth angle from the +Y direction toward the +X direction of greater than 20 degrees, greater than 30 degrees, greater than 35 degrees, less than 90 degrees, etc.).

By shining headlights 16 on external surfaces on the outboard sides of vehicle 10 such as object 28 and other roadways to the side of vehicle 10, occupants of vehicle 10 may view external surfaces even in dim ambient lighting conditions (e.g., at night). If desired, cornering light illumination 22 may be selectively (conditionally) provided in dim ambient lighting conditions such as when vehicle is turning or moving off of a given roadway 14 at night, or changing to a difference lane on a given roadway 14 at night, or in other scenarios. If desired, the operation of sensors in vehicle 10 such as image sensors and other sensors that use light may also be supported by providing these peripheral external surfaces with cornering light illumination.

In additional to providing cornering light illumination 22, headlights 16 may also provide front illumination 20 in a high-beam mode (e.g., providing high-beam front illumination) and a low-beam mode (e.g., providing low-beam front illumination), as examples. To provide compact headlights 16 that provide these and other functionalities, multiple light sources and reflectors for different functionalities or modes may be mounted to a shared platform that is disposed in the same housing, may share the use of other headlight components (e.g., a shutter, a heat sink, etc.), and may emit light through the same lens aperture.

Figure 2:
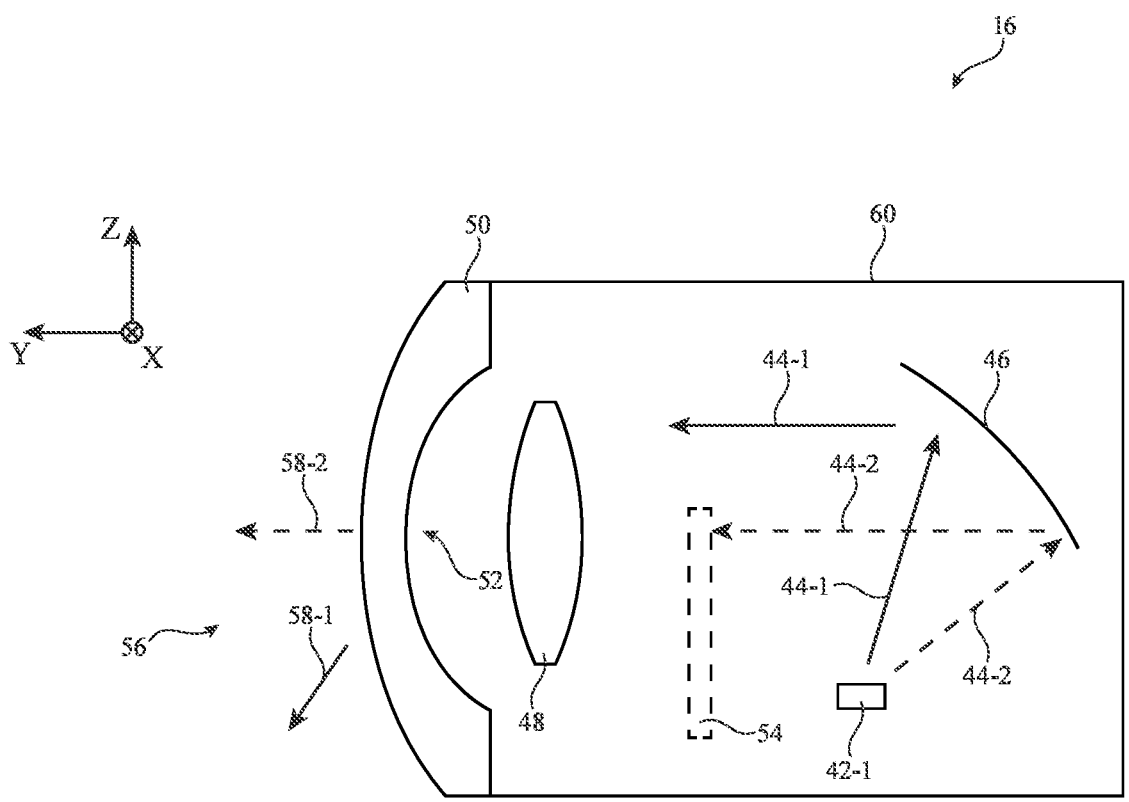
FIG. 2 is a side view of an illustrative adjustable headlight in accordance with an embodiment.

FIG. 2 is a cross-sectional side view of an illustrative adjustable headlight for vehicle 10. Vehicle 10 may have any suitable number of headlights (e.g., at least one, at least two, at least three, etc.). In an illustrative arrangement, vehicle 10 has left and right headlights 16 on front F of vehicle 10, as described in connection with FIG. 1. As shown in FIG. 2, headlight 16 may include headlight housing 60 and a headlight lens including lens elements 48 and 50 (sometimes referred to as lens 48 and lens 50). Housing 60 may include support structures and enclosure structures for supporting the components of headlight 16. These structures may facilitate mounting of headlight 16 to body 12. Housing 60 may include polymer, metal, carbon-fiber composites and other fiber composites, glass, ceramic, other materials, and/or combinations of these materials.

Lens 48 and lens 50 may include polymer, glass, transparent ceramic, and/or other materials that are transparent to visible light (and, if desired, infrared light such as near infrared light at one or more wavelengths from 800 to 2500 nm or other infrared light). Lens 48 and 50 may be used to help collimate light 56 and direct light 56 from headlight 16 in desired directions (e.g., to produce illumination such as illumination 20 of FIG. 1). While the headlight lens is shown to include two lens elements, this is merely illustrative. If desired, the headlight lens may include a single lens element or three or more lens elements. In the example of FIG. 2, lens 50 may include central portion 52 aligned with lens 48. Lens 48 and portion 52 of lens 50 may form the headlight lens aperture through which light 56 passes.

In illustrative configurations described herein as an illustrative example, the headlight lens may form a projection lens. The projection lens may be implemented using two aspherical lens components such as lens 48 and lens 50. The projection lens may be configured to have a wide field of view such as a field of view greater than 60 degrees, greater than 75 degrees, greater than 80 degrees, etc.

Light 56 may include visible light (e.g., light from 400 nm to 750 nm). Headlight 16 may be operated in a high-beam mode and a low-beam mode (as examples). In the high-beam mode, emitted light 56 includes light 58-2 that is directed forward horizontally (along the +Y axis of FIG. 2) as well as light 58-1 that is angled down slightly from the +Y axis). In the low-beam mode, some of the forward-directed light (e.g., light 58-2) is suppressed, so that only downwardly angled light such as light 58-1 is emitted.

Headlight 16 includes a light source such as light source 42-1. Light source 42-1 emits (visible) light such as light 44-1 and 44-2. Light 44-1 and 44-2 may be reflected in forward direction +Y by reflector 46 to produce corresponding reflected light 44-1 and 44-2. Reflector 46, which may be formed from metal, polymer, glass, and/or other materials, may have a parabolic profile or other curved cross-sectional profile (as an example). Metal coatings, dielectric thin-film coatings, and/or other coatings may be provided on reflector 46 to enhance reflectivity at visible wavelengths.

Reflected light 44-1 and 44-2 from reflector 46 may be controlled using an adjustable component such as adjustable light blocker 54. Light blocker 54 may be formed from an electrically adjustable light modulator layer, a physically adjusted shutter (e.g., a shutter that slides, rotates, and/or is otherwise moved by a positioner in a physical light-blocking device), or other device that can be electrically adjusted by control signals from control circuitry in components 24.

Adjustable light blocker 54 of FIG. 2 may be placed first and second positions relative to the optical path of light such as reflected light 44-2 using a positioner. The positioner may be an electrically adjustable positioner such as a motor, solenoid, and/or other actuator that moves one or more portions of light blocker 54 in response to commands from control circuitry in components 24. As an illustrative example, the positioner may have a hinge and an actuator that rotates light blocker 54 about a hinge axis associated with the hinge.

The control circuitry in components 24 can adjust light blocker 54 to adjust the amount and component of reflected light from reflector 46 that passes through the headlight lens. In a first mode (e.g., a low-beam mode), light blocker 54 is positioned as shown in FIG. 2. In this first mode, rays of light such as light 44-2 are blocked by light blocker 54. As a result, low-beam light 58-1 is present and high-beam light 58-2 is blocked and is not present. This visible light low-beam pattern may be used when vehicle 10 is facing oncoming traffic. In a second mode (e.g., a high-beam mode), light blocker 54 may be rotated or folded down about an axis of rotation associated with the positioner for light blocker 54. When light blocker 54 is moved downwards in this way (e.g., removed from the position shown in FIG. 2 and removed from the optical path of light 44-2), more rays of reflected light such as reflected light 44-2 are allowed to pass the headlight lens. As a result, a high-beam pattern of emitted light is present (e.g., high-beam light that includes both light 58-1 and light 58-2 is emitted). This visible high-beam pattern may be used when vehicle 10 is not facing oncoming traffic.

Figure 3:
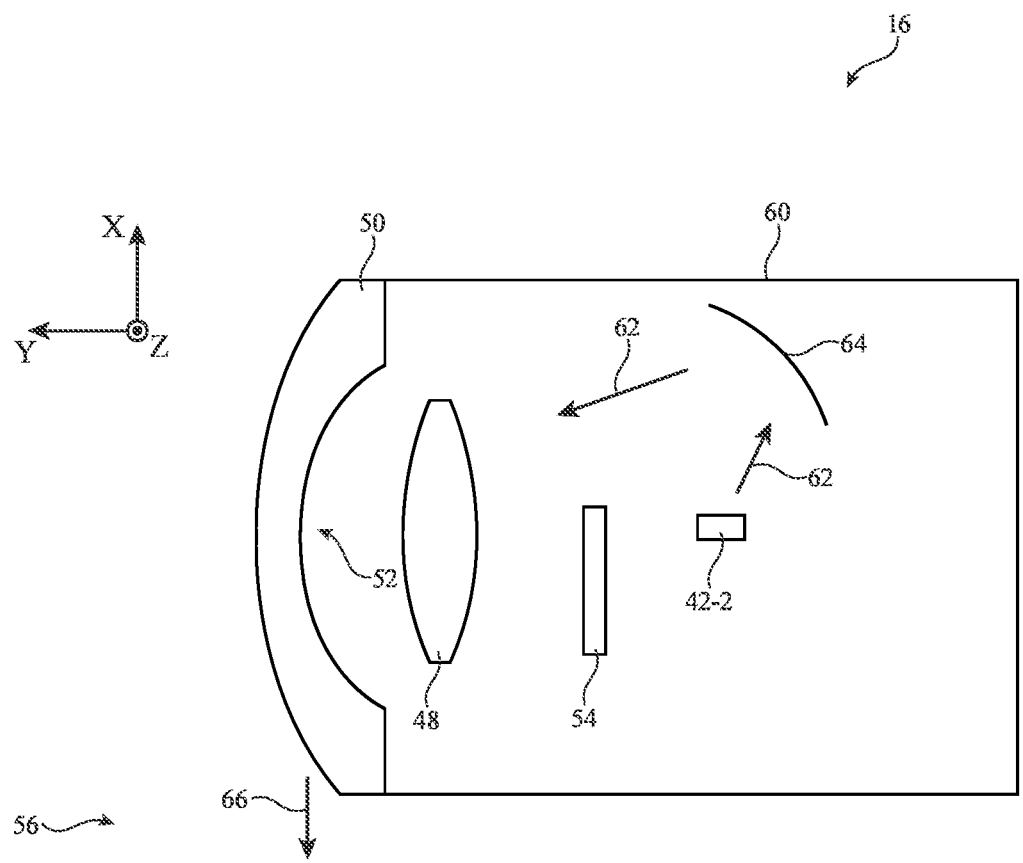
FIG. 3 is a top view of an illustrative headlight providing cornering light in accordance with an embodiment.

To provide a compact implementation of headlight 16 while providing additional functionalities such as cornering light in addition to high-beam light and low-beam light (as described in FIG. 2), headlight 16 may include an additional light source and an additional reflector that share the use of other components in headlight 16. FIG. 3 is a cross-sectional top view of an illustrative adjustable headlight for vehicle 10 (e.g., the same adjustable headlight shown in FIG. 2). Headlight 16 may be operated in a cornering light mode, as an example (in addition to the high-beam mode and the low-beam mode). In the cornering light mode, emitted light 56 includes light 66 that is directed to a peripheral direction (e.g., toward the −X direction in the example of FIG. 3, at an angle between the +X and −Y directions, off-axis from the Y-axis toward the X-axis, etc.). While FIG. 3 shows a top view of headlight 16 providing light 66 relative to the X-Y plane, in a side view, light 66 may be angled down slightly from the +Y direction toward the −Z direction (similar to light 58-1 in FIG. 2).

Configured in this manner, headlight 16 may provide a cornering light pattern that illuminates the outboard side of vehicle 10. In the illustrative example of FIG. 3 where the left outboard side (in the −X direction) of vehicle 10 is illuminated, headlight 16 may be mounted to body 12 as the left headlight. A mirrored version of the headlight of FIG. 2 (providing illumination to the right outboard side (in the +X direction)) may be provided and mounted to body 12 as the right headlight.

To operate in the cornering light mode, as shown in FIG. 3, headlight 16 include an additional light source 42-2 and an additional reflector 64 (in addition to light source 42-1 and reflector 46 in FIG. 2) enclosed and/or supported by housing 60. Light source 42-1 and reflector 46 (FIG. 2) may be provided within the same housing 60 and operate as described in FIG. 2, but are now shown in FIG. 3 for the sake of clarity.

Light source 42-1 may emits (visible) light such as light 62. Light 62 may be reflected in forward direction +Y by reflector 64 to produce corresponding reflected light 62. Reflector 64, which may be formed from metal, polymer, glass, and/or other materials, may have a parabolic profile or other curved cross-sectional profile (as an example). Metal coatings, dielectric thin-film coatings, and/or other coatings may be provided on reflector 64 to enhance reflectivity at visible wavelengths.

Reflected light 62 (in addition to reflected light 44-1 and 44-2 in FIG. 2) may be controlled using the same adjustable light blocker 54. The control circuitry in components 24 can adjust light blocker 54 to adjust the amount and component of reflected light 62 from reflector 64 that passes through the headlight lens (lens 48 and lens 50). In a third mode (e.g., the cornering light mode) in which headlight 16 can be operated, light blocker 54 may be positioned as shown in FIG. 3 (e.g., in the same position as the position for low-beam mode). In this mode, some rays of light (e.g., a portion of the reflected light from reflector 64) are blocked by light blocker 54. As a result, cornering light 66 forming a desired cornering light pattern is present in emitted light 56. In particular, light blocker 54 may help define the horizontal cutoff pattern (across the X-Y plane) such that light 66 is angled down slightly from the +Y direction (similar to what is done for the low-beam mode), and if desired may help define the vertical cutoff pattern (across the Y-Z plane) such that light 66 is angled to a peripheral side (e.g., to a left or right side) away from the +Y direction.

As shown in FIGS. 2 and 3, light source 42-1 and reflector 46 for high-beam and low-beam modes, and light source 42-2 and reflector 64 for a cornering light mode may be enclosed in the same housing 60, may share the use of light blocker 54, may pass through the same headlight lens aperture (defined by lens 48 and central portion 52 of lens 50). Configured in this manner, headlight 16 may provide a compact implementation for emitting different types of light exhibiting different patterns (e.g., light 44-1, 44-2, and 66). While headlight 16 may operate in the high-beam mode and the low-beam mode in a mutually exclusive manner, headlight 16 may operate in the cornering light mode while operating in either the high-beam mode or the low-beam mode. In other words, headlight 16 may emit cornering light (with or without a horizontal cutoff) along with high-beam light, and/or may emit cornering light (with a horizontal cutoff) along with low-beam light.

Figure 4:
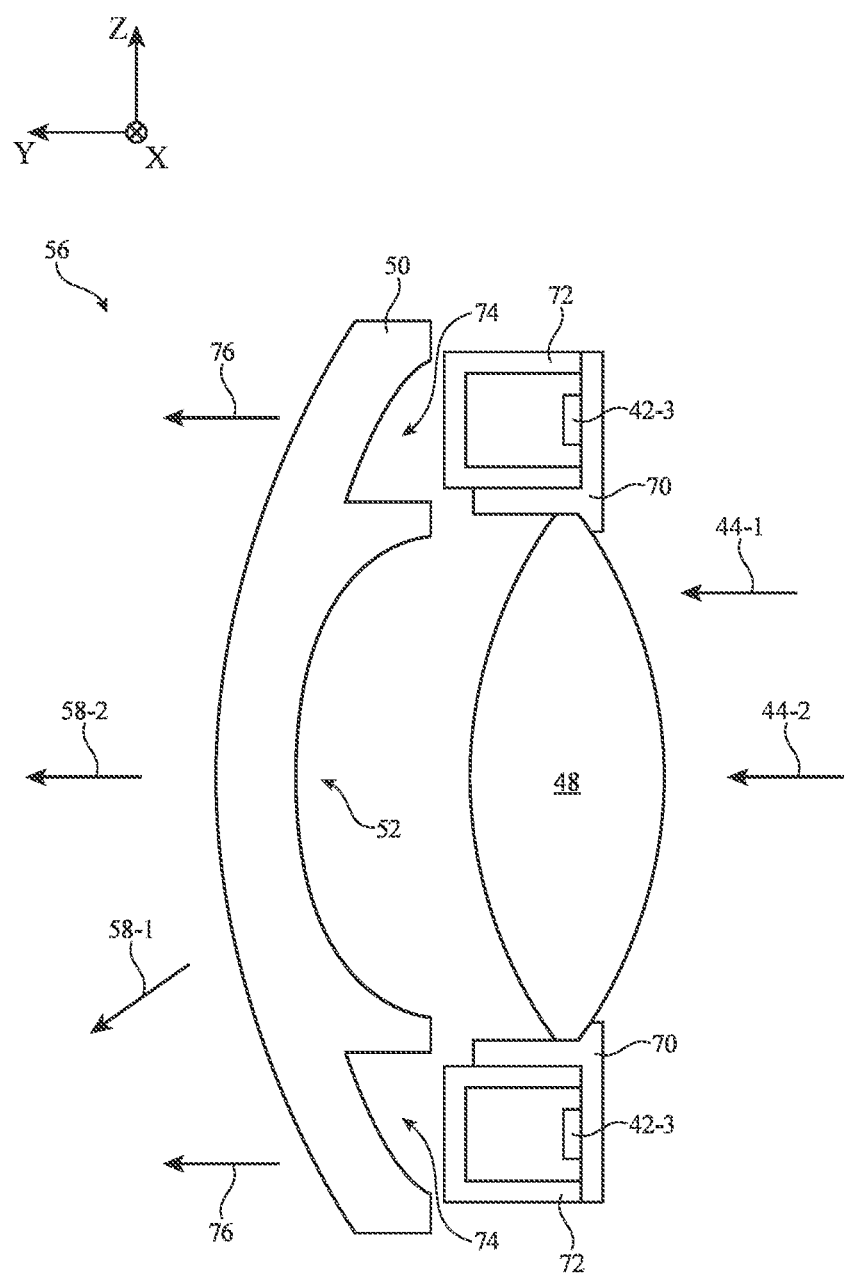
FIG. 4 is a cross-sectional side view of a portion of an illustrative headlight having light sources that enhance the illumination of the headlight in accordance with an embodiment.

In some illustrative configurations, headlight 16 when operating in the high-beam mode may exhibit an illumination pattern having insufficient intensity one or more areas. FIG. 4 is an illustrative cross-sectional side view of a portion of headlight 16 provided with additional light sources for increasing the illumination intensity for headlight 16 such as when operating in the high-beam mode.

As shown in FIG. 4, the headlight lens (e.g., lens 48 and lens 50) may be provided in a lens assembly. The lens assembly includes a lens supporting structure 70 having a central opening configured to receive and support lens 48. Lens 48 may be aligned (using lens supporting structure 70) with a central portion 52 of lens 50. Lens 48 and central portion 52 of lens 50 may form the aperture of the headlight lens. In particular, light such as light 44-1 and 44-2 (associated with high-beam light and low-beam light) and light associated with cornering light (light 62 in FIG. 3) may pass through lens 48 and central portion 52 of lens to be emitted by headlight 16 as light 58-1 and 58-2 and cornering light (light 66 in FIG. 3).

While the central portion of lens 50 is used as part of the headlight lens aperture, the peripheral operation surrounding central portion 52 may be unused (e.g., in the configurations of FIGS. 2 and 3). As such, one or more additional light sources 42-3 may be mounted to lens supporting structure 70 and aligned with peripheral portion 74 of lens 50. Each light source 42-3 on structure 70 may be covered by a light collimator structure 72 such as a total internal reflection collimator or optics structure that collimate light from light source 42-3 to pass through peripheral portion 74 of lens 50. As an example, the inner and outer surfaces of portion 74, through which collimated light from light sources 42-3 pass, may be parallel (e.g., portion 74 of lens 50 may have uniform thickness). Accordingly, light emitted from light sources 42-3 may ultimately be emitted as light 76 from the same peripheral portion 74 of lens 50 (e.g., without any lensing effecting). Because light sources 42-3 may be distributed along the circular periphery of lens 50, light 76 may exhibit a ring of light.

Configured in this manner, headlight 16 may emit light 56 including light 76 to increase the illumination intensity (e.g., in the high-beam mode). In other words, high-beam light emitted by headlight 16 may include light 58-1, 58-2, and 76. Whereas light 58-1 and 58-2 is produced from light source 42-1 (FIG. 2) via reflector 46 producing reflected light 44-1 and 44-2, light 76 is produced from one or more light sources 42-3.

Figure 5:
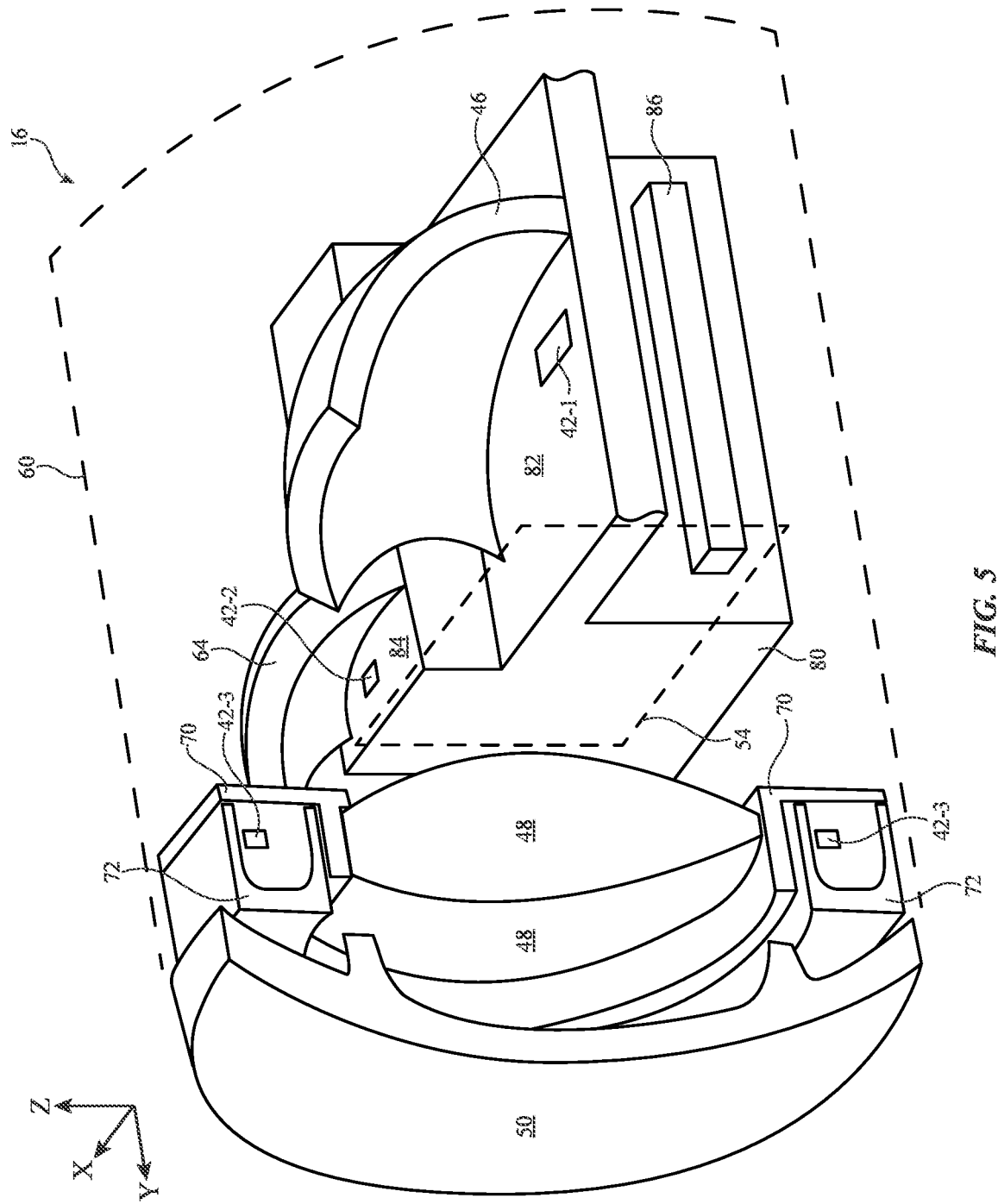
FIG. 5 is a perspective view of a portion of an illustrative headlight configured to provide high-beam light, low-beam light, and cornering light in accordance with an embodiment.

FIG. 5 is a perspective view of a portion of an illustrative adjustable headlight such as the headlight described in connection with FIGS. 2-4. As shown in FIG. 5, headlight 16 may include a support structure or platform 80 to which light sources 42-1 and 42-2, and reflectors 46 and 64 are mounted. Configurations in which support structure 80 is a heat sink are described herein as an illustrative example. In particular, support structure 80 when implemented as a heat sink may be formed from heat conducting material (e.g., metal) and may include fins that help dissipate heat away from the heat sink. By mounting light sources 42-1 and 42-2, and reflectors 46 and 64 to the heat sink, the heat sink can directly dissipate the light-source-generated heat and heat generated from the reflectors.

Light sources 42-1 and 42-2 (and one or more light sources 42-3) may each include one or more light-emitting devices such as light-emitting diodes, lasers, lamps, or other components that emit light. Reflectors 46 and 64 may be formed by depositing (e.g., sputtering) reflective material such as aluminum on an underlying molded support structure such as a molded plastic. Reflectors 46 and 64 may be freeform reflectors.

Light source 42-1 and reflector 46 for high-beam and low-beam light may be mounted to a first surface 82 of support structure 80. The geometry of the inner reflective surface of reflector 46 facing light source 42-1 may be configured to reflect light toward the headlight lens aperture and provide high-beam light with a suitable illumination pattern. To switch between high-beam and low-beam modes, light blocker 54 such as an adjustable shutter may be adjusted between two or more positions by positioner 86 having an actuator with a solenoid. In a particular position (that provides a horizontal cutoff pattern for the low-beam mode), light blocker 54 may block some of the light reflected from reflector 46 from reaching the lens aperture (e.g., lens 48 and a central portion of lens 50), and the unblocked light from reflector 46 may provide the low-beam light.

Light source 42-2 and reflector 64 for cornering light may be mounted to a second surface 84 of support structure 80 elevated above surface 82. The geometry of the inner reflective surface of reflector 46 facing light source 42-2 may be configured to reflect light toward the headlight lens aperture and provide cornering light with a suitable illumination pattern. Light blocker 54 adjusted to a particular position (e.g., the same position for low-beam mode), may block some of the light reflected from reflector 64 from reach the lens aperture, and the unblocked light from reflector 64 may provide the cornering light. Light blocker 54 may therefore be disposed between reflector 46 and the headlight lens, and between reflector 64 and the headlight lens.

In the example of FIG. 5, headlight 16 may have a circular outline when viewed along the Y-axis. Accordingly, lens 50 may have a circular outline when viewed along Y-axis. The central portion (portion 52 in FIG. 4) defining the headlight lens aperture may be an inner circular portion, while the peripheral portion through which light sources 42-3 emit light may be a ring portion surrounding the inner circular portion. Lens 48 may also have a circular outline when viewed along the Y-axis and may align with the central portion of lens 50 (along the Y-axis) when mounted in lens support structure 70. Lens support structure 70 may form a ring-shaped structure that overlaps the peripheral portion of lens 50 and that has an opening overlapping the central portion of lens 50 for receiving lens 48.

Light sources 42-3 (e.g., for boosting illumination intensity in the high-beam mode) may be mounted on the ring-shaped lens support structure 70 and may be distributed around a central axis of headlight 16. Configured in this manner, light sources 42-3 may emit light through the peripheral ring portion of lens 50. Light collimators 72 may have individual cells (separate collimators) that each overlap a corresponding one of light sources 42-3.

One or more components in headlight 16 such as lens 50 and 48, lens support structure 70, platform 80, etc., may be mounted to and enclosed by housing 60. One or more components in headlight 16 may be mounted to other components via any suitable attachment or biasing structures such as adhesive, screws or other fastener, welds, etc. If desired, lens 50 may form a front face of headlight 16, while housing 60 may form all other sides and the rear face of headlight 16. In some illustrative configurations, when headlight 16 is mounted to body 12, lens 50 may form an exterior surface of vehicle 10. If desired, one or more (protective) coating layers may be deposited on lens 50. In some illustrative configurations, when headlight 16 is mounted to body 12, lens 50 may further be overlapped by a cover layer through which light emitted by headlight 16 passes to reach an exterior of vehicle 10.

Configured in the manner described in connection with FIGS. 2-5, headlight 16 may provide a compact implementation of a headlight operable in multiple modes (e.g., a high-beam mode, a low-beam mode, and a cornering light mode) to emit light in different directions and having different illumination patterns such that, when mounted in vehicle 10, the headlight can selectively illuminate one or more different areas (associated with roadways and/or objects in the vicinity of vehicle 10).

Figure 6:
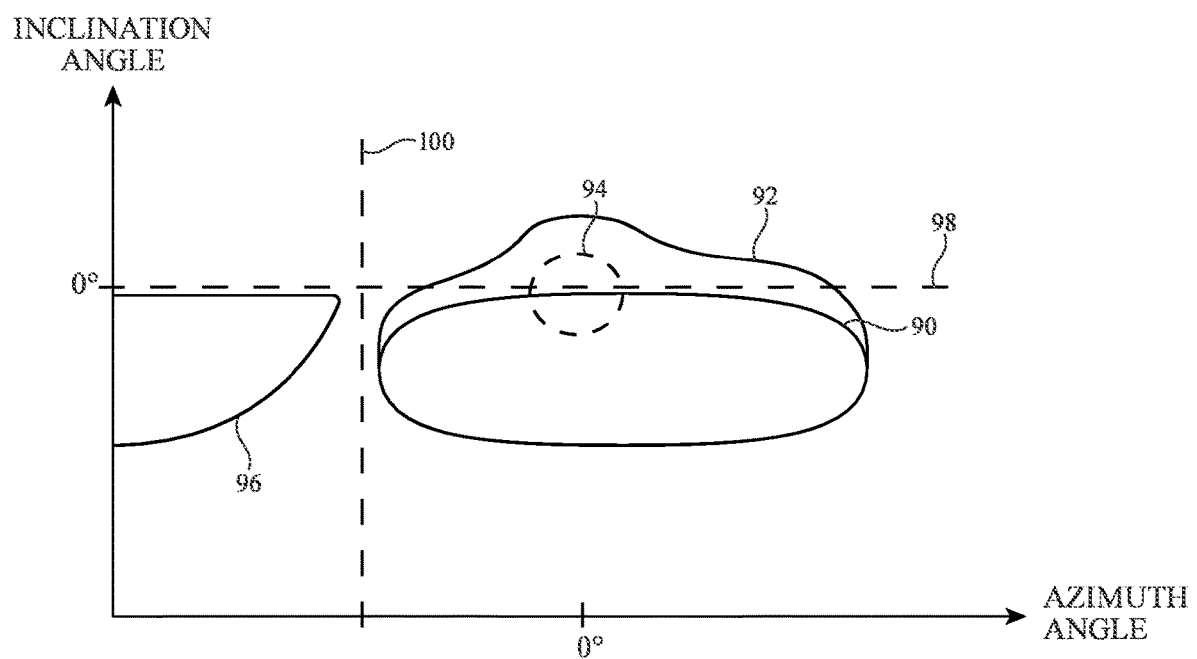
FIG. 6 is a graph showing illustrative illumination patterns provided by a headlight of the type shown in FIG. 5 when operating in different modes in accordance with an embodiment.

FIG. 6 is a graph showing illustrative illumination patterns for different modes of operating headlight 16. In FIG. 6, (projected) illumination patterns 90, 92, and 94 are shown with respect to an azimuth angle along a horizontal plane (e.g., along the X-Y plane in FIG. 5) and an inclination angle along a vertical plane (e.g., along the Y-Z plane in FIG. 5) with the 0 degrees azimuth angle and 0 degrees inclination angle being light emitted exactly in the +Y direction (FIG. 5). The illumination patterns in FIG. 6 are illustrative and serve to clarify one or more characteristics of the different illumination patterns. The illumination patterns emitted by headlight 16 may vary from what is shown in FIG. 6.

As shown in FIG. 6, headlight 16 operated in a low-beam mode (e.g., using light source 42-1, and a shutter in a low-beam mode position that blocks the high-beam light portion and defines a horizontal cutoff pattern) may exhibit illumination pattern 90. Illumination pattern as a cutoff pattern that cuts off light above a certain inclination angle shown by line 98. Headlight 16 operated in a high-beam mode (e.g., using light source 42-1, and a shutter in a high-beam mode position that unblocks the high-beam light portion, and additionally using supplemental light sources 42-3) may be exhibit illumination pattern 92 (that includes the unblocked high-beam light portion above line 98). The supplemental light sources 92-3 may help increase the intensity of the high-beam light directly in front of headlight 16 to generate hot spot 94 having a desired intensity. Headlight 16 operated in a cornering light mode (e.g., using light source 42-2 and the shutter in the low-beam mode position defining the horizontal cutoff pattern) may exhibit illumination pattern 96 (e.g., to the left outboard side of vehicle 10). If desired, a vertical cutoff pattern shown by line 100 separating illumination pattern 96 from illumination patterns 90 and 94 may be defined by the relative placement of the light sources and reflectors, and/or by light blocker or shutter structures (e.g., the shutter used to define the horizontal cutoff pattern).

Figure 7:
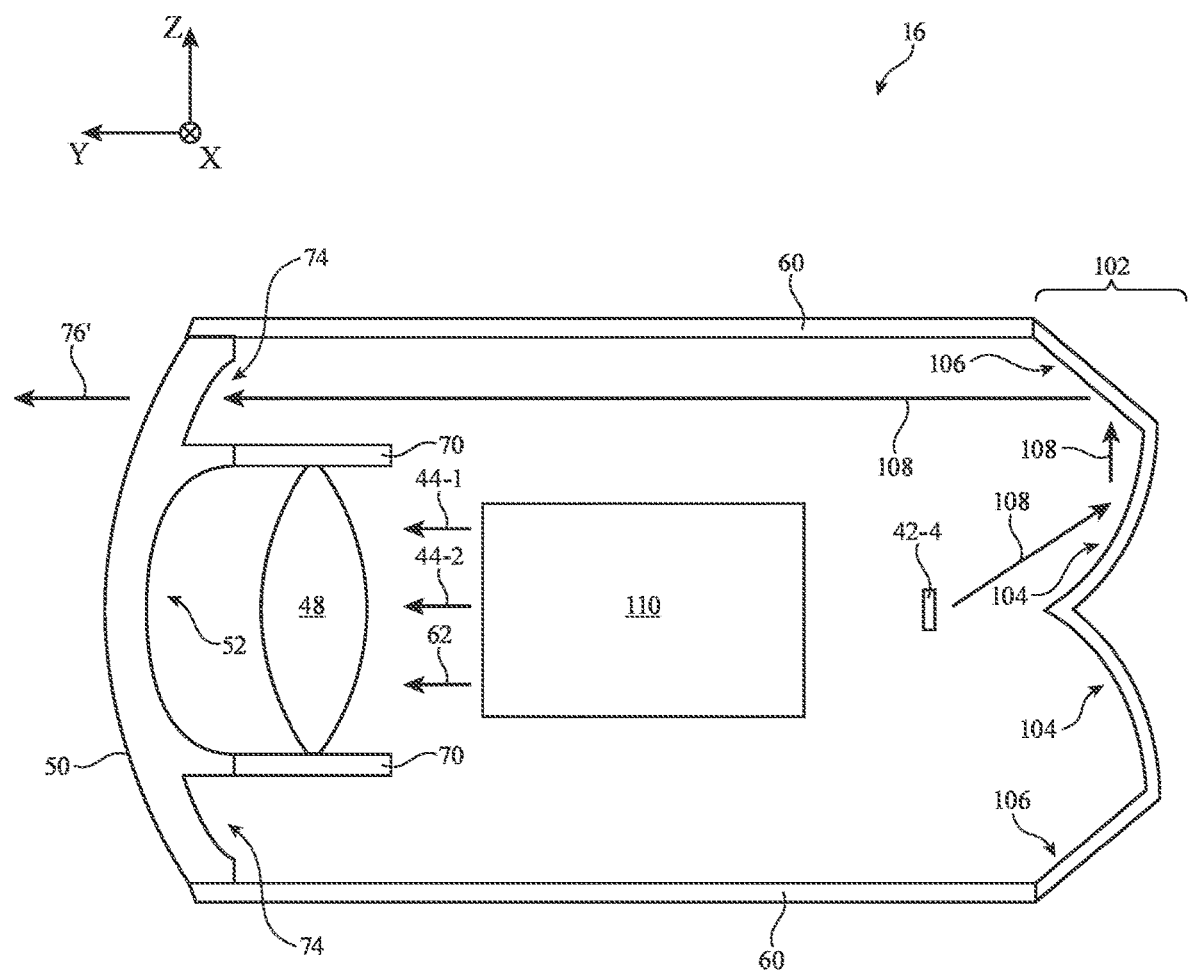
FIG. 7 is a cross-sectional side view of an illustrative headlight having a light source and a rear reflector configured to enhance the illumination of the headlight in accordance with an embodiment.

FIG. 7 is a cross-sectional side view of an illustrative adjustable headlight. In particular, to boost the hot spot illumination intensity in the high-beam light, headlight 16 may include a light source 42-4 (e.g., in place of the light sources 42-3 in FIGS. 4 and 5). Light source 42-4 (e.g., one or more light-emitting devices such as light-emitting diodes, lasers, lamps, or other components that emit light) may emit light 108 toward reflector 102. Reflector may be mounted to housing 60 and/or may be formed from a portion of housing 60 having reflective interior surfaces. In the example of FIG. 7, reflector 102 may form a rear face of headlight 16.

Reflector 102 may include a first parabolic surface 104 and a second planar surface 106. Light 108 emitted by light source 42-4 may be reflected first by surface 104 and then by surface 106 toward the front of headlight 16. Light 108 reflected by reflector 102 may be passed through the peripheral portion 74 of lens 50 as light 76'. Light 76' (forming a portion of the high-beam illumination) may be emitted by headlight 16 operating in the high-beam mode to boost the light intensity directly in front of headlight 16 to generate an intensity hot spot (e.g., hot spot 94 in FIG. 6). While only light 108 provided to the top half of reflector 102 is shown in FIG. 7, light source 42-4 may emit light toward reflector 102 in additional directions (e.g., to the bottom half of reflector 102). In fact, reflector 102, when viewed along the Y-axis, may have a circular outline, and light source-42-4 may emit light toward surface 104 of reflector 102 in a conical pattern. Accordingly, light 76' may be provided all along the peripheral portion 74 of lens 50 (e.g., as a ring of light).

In the configuration of FIG. 7, the main light source assembly such as assembly 110 (e.g., including light sources 42-1 and 42-2, reflectors 46 and 64, light blocker 54, positioner 86, platform 80, etc., in FIG. 5) may still be included to emit light such as light 44-1, 44-2, and 62 through the headlight lens aperture (e.g., lens 48 and portion 52 of lens 50) to generate the other portions of high-beam light, low-beam light, and cornering light. Because light 108 reflected from reflector 102 is provided all around the internal periphery of headlight 16, bulky components such as a heat sink, positioner 86, or other bulky components in assembly 110 may block a substantial portion of the reflected light 108. As such, these bulky components may be miniaturized and/or moved to an extended housing portion of headlight 16 not overlapping reflector 102.

Figure 8:
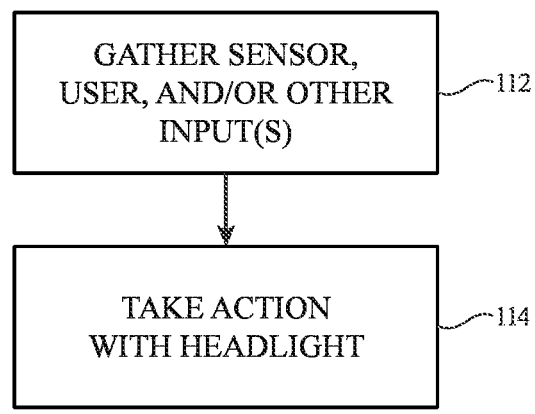
FIG. 8 is a flow chart of illustrative operations involved in using a vehicle with headlights in accordance with an embodiment.

Illustrative operations involved in using vehicle 10 are shown in FIG. 8.

During the operations of block 112, control circuitry (e.g., implemented by one or more components 24) of vehicle 10 may gather sensor data from one or more sensors, may gather user data (e.g., a user input), and/or may gather other inputs.

During the operations of block 114, the control circuitry may operate one or more headlights of vehicle 10 based on the inputs gathered in block 112. As examples, based on the gathered inputs, the control circuitry may operate a headlight such as headlight 16 in FIGS. 1-5 and 7 in one or more modes (e.g., a high-beam mode, a low-beam mode, and a cornering light mode). As examples, the control circuitry may operate headlight 16 to emit only high-beam light, only low-beam light, low-beam light and cornering light, high-beam light and cornering light. In particular, configurations in which control circuitry perform the operations of block 114 to determine when to operate headlight 16 to emit cornering light and/or stop emitting cornering light are described herein as an illustrative example.

In an illustrative configuration, during the operations of block 112, the control circuitry may identify a speed of vehicle 10, a steering angle of vehicle 10, a turning signal status of vehicle 10, a location of vehicle 10, and/or other data on vehicle 10, may identify external objects (e.g., pedestrians, street signs, street lights, etc.) or roadways in the vicinity of vehicle 10 (e.g., using lidar), and/or may identify other inputs. As examples, during the operation of block 114, the control circuitry may operate headlight 16 to emit cornering light in response to the speed of vehicle 10 slowing to below a threshold value, a steering angle of vehicle 10 being greater than a threshold value, a turning signal of vehicle 10 being on, a location of vehicle 10 being at an intersection, external objects being on the outboard side on vehicle 10, multiple of these conditions being satisfied, and/or in response to other conditions being satisfied, and may stop emitting cornering light when one or more of these conditions are no longer satisfied.

The foregoing is merely illustrative and various modifications can be made to the described embodiments. The foregoing embodiments may be implemented individually or in any combination.

What is claimed is:

1. A vehicle headlight, comprising:
 a housing;
 a lens mounted to the housing;
 a first light source disposed in the housing and configured to emit first light that passes through a central portion of the lens for a first mode;
 a second light source disposed in the housing and configured to emit second light that passes through the central portion of the lens for a second mode;
 a light blocker configured to define a cutoff pattern for the first light and a cutoff pattern for the second light when the light blocker is in a position that overlaps the central portion of the lens, wherein the first light comprises cornering light; and wherein the second light comprises low beam light.

2. The vehicle headlight defined in claim 1, further comprising:
a support structure to which the first and second light sources are mounted;
a first reflector mounted to the support structure and configured to reflect the emitted first light to pass through the central portion of the lens; and
a second reflector mounted to the support structure and configured to reflect the emitted second light to pass through the central portion of the lens.

3. The vehicle headlight defined in claim 2, wherein the first mode is a cornering light mode and the first light provides cornering light illumination.

4. The vehicle headlight defined in claim 3, wherein the second mode is a high-beam mode and the second light provides high-beam illumination.

5. The vehicle headlight defined in claim 4, wherein
the light blocker, when in the position, is configured to block a portion of the emitted second light for a low-beam mode and an unblocked portion of the emitted second light provides low-beam illumination.

6. The vehicle headlight defined in claim 2, wherein the support structure comprises a heat sink.

7. The vehicle headlight defined in claim 2, wherein the first light source and the first reflector are mounted on a first surface of the support structure, and the second light source and the second reflector are mounted on a second surface of the support structure, the first surface being elevated above the second surface.

8. The vehicle headlight defined in claim 2, wherein the lens comprises first and second lens components, the first lens component has the central portion of the lens and is aligned with the second lens component, and the central portion of the first lens component and the second lens component define an aperture of the lens.

9. The vehicle headlight defined in claim 8, further comprising:
a lens support structure that overlaps a peripheral portion of the first lens component and that has an opening that overlaps the central portion of the first lens component, wherein the second lens component is disposed in the opening.

10. The vehicle headlight defined in claim 9, further comprising:
one or more additional light sources mounted to the lens support structure and configured to emit light through the peripheral portion of the first lens component.

11. The vehicle headlight defined in claim 10, further comprising:
one or more light collimator structures each overlapping a corresponding one of the one or more additional light sources.

12. The vehicle headlight defined in claim 1, further comprising:
a third light source disposed in the housing; and
a reflector mounted to the housing and configured to reflect light emitted by the third light source to pass through a peripheral portion of the lens surrounding the central portion of the lens.

13. The vehicle headlight defined in claim 1, wherein
the light blocker is configured to block a portion of the first light emitted by the first light source and to block a portion of the second light emitted by the second light source when in the position.

14. The vehicle headlight defined in claim 13, further comprising:
an electrically adjustable positioner coupled to the light blocker and configured to switch the light blocker between the position and an additional position that unblocks the portion of the first light emitted by the first light source and unblocks the portion of the second light emitted by the second light source.

15. A vehicle, comprising:
a vehicle body; and
a headlight on the vehicle body that has first and second light sources and a lens having a concave portion, wherein the headlight is configured to emit low-beam light using first light emitted by the first light source that passes through the concave portion of the lens and is configured to emit cornering light using second light emitted by the second light source that passes through the concave portion of the lens and wherein the headlight has an adjustable light blocker configured to define a cutoff pattern for the low-beam light and a cutoff pattern for the cornering light.

16. The vehicle defined in claim 15, wherein the headlight has a first reflector configured to receive the first light and to reflect the first light to pass through the concave portion of the lens and a second reflector configured to receive the second light and to reflect the second light to pass through the concave portion of the lens.

17. The vehicle defined in claim 16, wherein the adjustable light blocker is between the first reflector and the concave portion of the lens and between the second reflector and the concave portion of the lens.

18. A vehicle light, comprising:
a first light-emitting device;
a first reflector for the first light-emitting device;
a second light-emitting device;
a second reflector for the second light-emitting device;
a lens; and
an adjustable light blocker between the first reflector and the lens and between the second reflector and the lens, wherein the adjustable light blocker, when in a first position, is configured to block a portion of light reflected off of the first reflector and is configured to block a portion of light reflected off of the second reflector, wherein an unblocked portion of the light reflected off of the first reflector pass through the lens as cornering light, and wherein an unblocked portion of the light reflected off of the second reflector passes through the lens as low-beam light.

19. The vehicle light defined in claim 18, wherein the adjustable light blocker, when in a second position, is configured to unblock light reflected off of the second reflector, and the unblocked light reflected off of the second reflector passes through the lens as high-beam light.

20. The vehicle headlight defined in claim 1, wherein the central portion of the lens comprises a concave portion of the lens.

* * * * *

UNITED STATES PATENT AND TRADEMARK OFFICE
CERTIFICATE OF CORRECTION

| | | |
|---|---|---|
| PATENT NO. | : 11,879,610 B2 | Page 1 of 1 |
| APPLICATION NO. | : 17/890872 | |
| DATED | : January 23, 2024 | |
| INVENTOR(S) | : Xiaofeng Tang et al. | |

It is certified that error appears in the above-identified patent and that said Letters Patent is hereby corrected as shown below:

On the Title Page

Right Column, Item (57) Line 9, "a cutoff pattern that define" should read -- a cutoff pattern that defines --

In the Claims

Column 14, Line 50, "the first reflector pass through" should read -- the first reflector passes through --

Signed and Sealed this
Thirty-first Day of December, 2024

Derrick Brent
*Acting Director of the United States Patent and Trademark Office*